J. V. PILCHER.
BUTTON.
APPLICATION FILED JUNE 25, 1917.
Reissued Aug. 7, 1917.
14,342.
Fig. I.
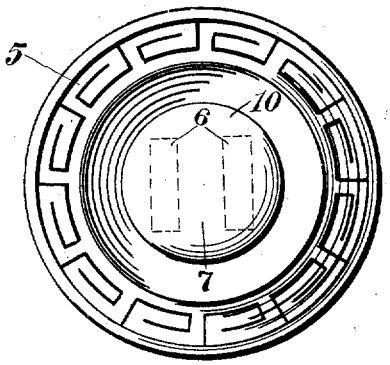
Fig. III.
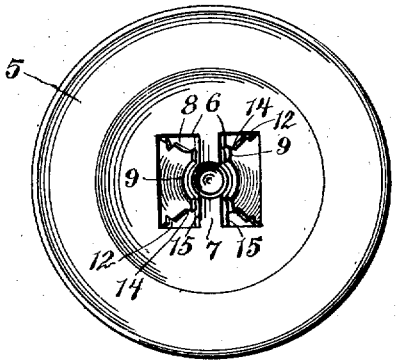
Fig. II.
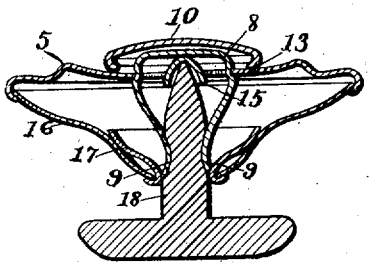
Fig. IV.
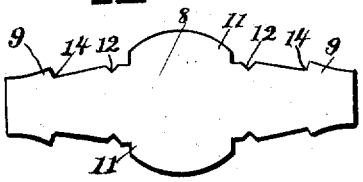
Fig. V.
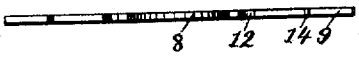
Inventor
John Vashe Pilcher.
Witnesses
W. S. Waller.
D. E. Waller.
By W. E. Stevens.
Attorney

UNITED STATES PATENT OFFICE.

JOHN VASHE PILCHER, OF LOUISVILLE, KENTUCKY.

BUTTON.

14,342. Specification of Reissued Letters Patent. Reissued Aug. 7, 1917.

Original No. 1,226,692, dated May 22, 1917, Serial No. 78,862, filed February 17, 1916. Application for reissue filed June 25, 1917. Serial No. 178,519.

*To all whom it may concern:*

Be it known that I, JOHN VASHE PILCHER, a citizen of the United States, residing at Louisville, in the county of Jefferson and State of Kentucky, have invented certain new and useful Improvements in Buttons, of which the following is a specification.

This invention relates in general to that class of garment buttons, sometimes called bachelors' buttons, which are adapted to be attached to a garment or to be detached therefrom by the fingers of the operator without the aid of any implement, and its object is to make an improvement in the button which is the subject of my Letters Patent No. 1051849, particularly with reference to the key employed for locking the stud to the button head when in service. As formerly constructed the inner ends of this key could be swung so far from center that it was sometimes possible to insert the stud to one side of the key legs instead of between them, and it was also possible to work the key to and fro sidewise until it would come out of the top, thus endangering loss of the key. To overcome these objections this invention consists in the construction and combination of parts forming a button hereinafter more fully described and particularly stated in the claims, reference being had to the accompanying drawings, in which—

Figure 1 is a top view and Fig. 2 shows a transverse vertical view of a button according to my invention.

Fig. 3 is an underside view of the top with the key in place.

Fig. 4 shows the form of a blank key as punched from sheet metal.

Fig. 5 is an edgewise view of the key blank, all views being of abnormal size to show details.

Numeral 5 represents the top of the button, having two slots 6, through it, leaving between them a crossbar 7. The key 8 has two legs 9, inserted through the slots 6, and is provided with a cap 10, having edges turned under to engage the side flanges 11, of the key. These edges are smoothly rounded to be easily and safely grasped by a person's finger nails in operating the key. Nicks 12, are cut in the edges of the legs to weaken their resistance to being bent so as to locate the hip 13, at the exact point desired. The under side 16, supports a guiding ring 17, which is engaged by the key legs 9, to hold the stud 18, in service. Thus far I have described only what is shown in my former patent above referred to. The principal characteristic of the present invention is one or more shoulders projecting from a face of each leg of the key to engage the top 5 at a side of a slot 6, to prevent removal of the key. The most practical way which I have thus far discovered for adapting these shoulders is to cut notches in the edges of the legs forming shoulders 14, which are bent inwardly when the legs are curved, as shown in Fig. 3 to fit around the stud. These shoulders will engage the crossbar 7, if any force tends to pull the key out of the button top, and retain the key in place. The crossbar is bent inwardly at its edges, forming flanges 15, which prevent the legs of the key from being swung far from center, so that an incoming stud will be sure to enter between them. It is evident that shoulders to perform the same function as the shoulders 14, may be differently shaped to project from a face of each leg to engage the under face of the top at a side of the slot; the sides here referred to being the sides of the crossbar or practically parallel with them.

I claim;

1. In a button, a head slotted through the top; a stud to enter the bottom; a key having two legs passing through the top to engage the stud, each leg of the key having a projecting hip near the under side of the top.

2. In a button, a head slotted through the top and leaving a crossbar between two slots; a stud to enter the bottom; a key having two legs to enter the said slots in the top to engage the stud, the said crossbar having inwardly turned flanges to engage the key legs.

In testimony whereof I affix my signature in presence of two witnesses.

JOHN VASHE PILCHER.

Witnesses:
NELLIE MILES JONES,
LOUIS J. KIEFFER.

Copies of this patent may be obtained for five cents each, by addressing the "Commissioner of Patents, Washington, D. C."